Sept. 17, 1963 H. R. SMITH, JR 3,104,321
APPARATUS FOR IRRADIATING PLASTIC TUBULAR MEMBERS WITH
ELECTRONS DEFLECTED BY A NON-UNIFORM MAGNETIC FIELD
Filed June 9, 1960 2 Sheets-Sheet 2

INVENTOR.
HUGH R. SMITH, JR.
BY
Lippincott, Ralls & Hendrickson
ATTORNEYS

# United States Patent Office 3,104,321
Patented Sept. 17, 1963

3,104,321
APPARATUS FOR IRRADIATING PLASTIC TUBULAR MEMBERS WITH ELECTRONS DEFLECTED BY A NON-UNIFORM MAGNETIC FIELD
Hugh R. Smith, Jr., Piedmont, Calif., assignor to Temescal Metallurgical Corporation, Richmond, Calif., a corporation of California
Filed June 9, 1960, Ser. No. 35,059
5 Claims. (Cl. 250—49.5)

The present invention is directed to the improvement and simplification of method and apparatus for uniformly irradiating materials, and particularly materials having an elongated configuration.

It is well known that various materials undergo particular changes when subject to ionizing radiation, and in particular, it has been found that various organic materials undergo beneficial and advantageous changes when selectively irradiated. Although the irradiation of materials may be carried out for a wide variety of purposes ranging from the preservation of foodstuffs to the establishment of desired crystal imperfections, it is not herein intended to treat the results of irradiation beyond the notation that the utility thereof is well known, and explanations thereof are set forth in the open literature. More specifically to the present invention, same is directed to the provision of improved irradiation, particularly with respect to material which is adapted to be substantially continuously passed through an irradiation zone. As an example of such material, the following disclosure of the present invention is referenced to the irradiation of plastic-coated wire.

Considering the single example of the present invention, wherein electrically conducting wire having plastic insulation thereon is to be irradiated, it is noted that various polymers experience multiple cross-linkage when subjected to ionizing radiation, and that as a result of this cross-linkage the polymer then exhibits different physical characteristics. With regard to the applicability of same to electrical insulation, the irradiated polymer exhibits a materially enhanced high temperature stability, so that the resultant end product has extended utility, particularly in those applications wherein electrical insulation must withstand elevated temperatures.

Although various types of radiation may be employed in material processing, it is of advantage to employ electron beams in this respect. The ease of generation and control experienced in electron beam technology serves to commend electron beam bombardment for irradiation processing. It is furthermore generally a requisite in irradiation processing for the material being irradiated to receive a substantially equal amount of energy deposition uniformly therethrough, and consequently, it is not normally feasible to direct radiation upon a single side of materials undergoing processing. In particular, as regards the example hereof wherein the insulation of an electrical conductor is to be uniformly irradiated, it will be appreciated that the conductor itself will shield a portion of the material in the instance wherein radiation is directed upon same from but a single side. The alternative would appear to require the utilization of multiple radiation sources, however this, in itself, is undesirable in view of the cost and the complexity of interlocking control of such sources.

The present invention provides for the uniform irradiation of material, such as the plastic insulation upon an electrical conductor, from a single electron source, and further provides for the bombardment of all of the surface of such insulation. In accordance with the present invention, there is generated a single electron beam which is directed toward material to be irradiated, such as, for example, an insulated electrical conductor, and such electron beam is magnetically guided to spiral onto the exterior surface of the material entirely about same. Continuous processing is achieved herein by movement of the material, such as the insulated wire, through the irradiation zone, whereby the entire length of the material is irradiated in the same manner as noted above in connection with an individual segment thereof. The end result of the process herein is the substantially uniform irradiation of the entire material undergoing processing, while yet employing but a single radiation source located upon only one side of the material, and through the utilization of simplified apparatus wherein uniformity of irradiation is guaranteed and control of same is maximized.

Numerous objects and advantages of the present invention will become apparent to those skilled in the art from the following description of the method and apparatus hereof, as related to a single application of the present invention; however, no limitation is intended by the terms of such description, and instead, reference is made to the appended claims for a precise delineation of the true scope of the present invention.

The invention is illustrated in the accompanying drawings, wherein.

Figure 3:
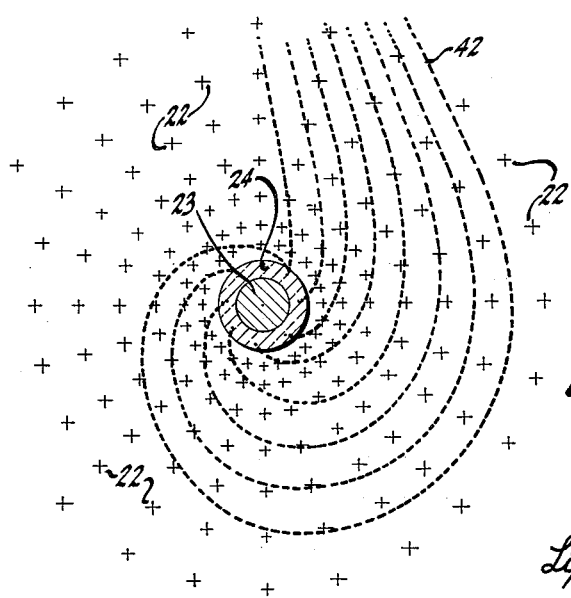
FIG. 3 is an enlarged diagrammatic representation of the bombarding beam configuration about the insulated wire undergoing irradiation.

The irradiation method of the present invention provides a material simplification in the attainment of uniform irradiation of materials, and includes the step of generating an electron beam and directing same generally toward material to be irradiated thereby. A further step in the method hereof is the establishment of a magnetic field directed generally transversely to the direction of traverse of the electron beam, and furthermore, having lines of force bowed outwardly. The electron beam is directed into the convex magnetic field transversely thereto and in the central equipotential plane thereof. In the instance wherein elongated materials are to be irradiated, the magnetic field is generated substantially longitudinally thereof, and bowing outwardly therefrom. The electron beam aforementioned is directed into the generated magnetic field, so as to pass perpendicularly to the lines of force thereof, and consequently, to experience a deflecting force which serves to establish a curved electron trajectory. With the magnetic field having a greater strength adjacent the material to be irradiated than radially outward therefrom, the electron beam will consequently be subjected to an ever increasing deflecting force as same approaches the material. As a consequence of this original electron trajectory, and the deflecting force exerted by the electrons passing perpendicularly through the generated magnetic field, there will be achieved a spiralling electron path which may approximate that illustrated in FIG. 3 of the drawings. With the electrons spiralling radially inward about the material to be irradiated, it will be seen that the entire exterior surface of the material is thus bombarded by inwardly moving electrons, again as illustrated in FIG. 3. A continuous irradiation process may be achieved by providing relative movement between the material to be irradiated and the electron beam as, for example, by translating the material transversely to the electron beam and longitudinally of the magnetic field. In the instance wherein the insulation of an electrical conductor is to be irradiated, for example, the conductor may be passed from one reel to another through the plane of the electron beam. Further to the method of irradiation of the present invention, the magnetic field is generated to have lines of force which curve back toward the material undergoing irradiation, from an equipotential field plane of irradiation. The electron beam is directed in this plane of irradiation so that it is passing perpendicularly to the magnetic field in such plane. Any portion of the electron beam outside of the plane, will thus experience a magnetic field which is convex, and which, consequently, applies a deflecting force to the electrons in such a direction as to urge same back into the plane of irradiation. There is consequently achieved hereby a focusing effect so as to maintain the irradiating electron beam in substantially a single plane, and furthermore, to curve the electron beam trajectory in such plane so as to swirl the beam about the material being irradiated, and consequently, to bombard all surfaces of such material in the plane.

By the establishment of a magnetic field having an increasing intensity closer to the material being bombarded, and by the direction of an electron beam generally perpendicularly into such field, it will be appreciated that the electron beam is acted upon by increasing deflecting forces as same approaches the material, and consequently, is subjected to a greater curvature in the trajectory thereof. This increasing radially inward force upon the bombarding electrons will thus serve to constrain same into an inwardly spiralling orbit, and thus will consequently provide for same to impinge upon all of the exterior surface of the material disposed at the center of the magnetic field intensity. The curved magnetic field configuration employed herein furthermore serves the purpose of focusing the bombarding electron beam into a single plane of irradiation, so that variations in electron trajectory from such plane will be counteracted by forces urging electrons back into the plane. This is highly advantageous in the precise control of irradiation, and in the utilization of a maximum amount of energy from the generated electron beam for deposition in the material undergoing irradiation.

Figure 1:
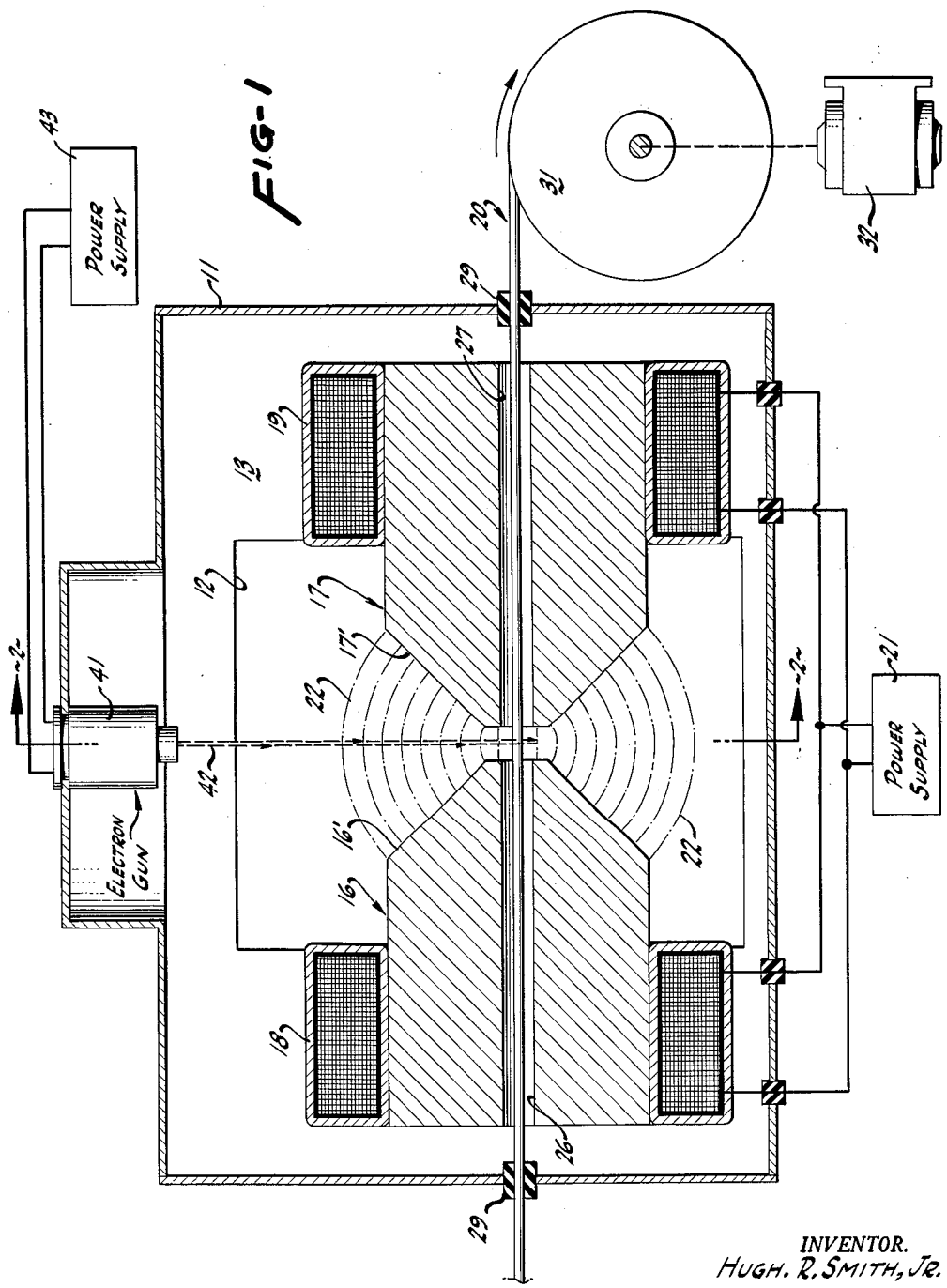
FIG. 1 is a sectional view taken in a longitudinal plane through a preferred embodiment of the apparatus of the present invention.
Figure 2:
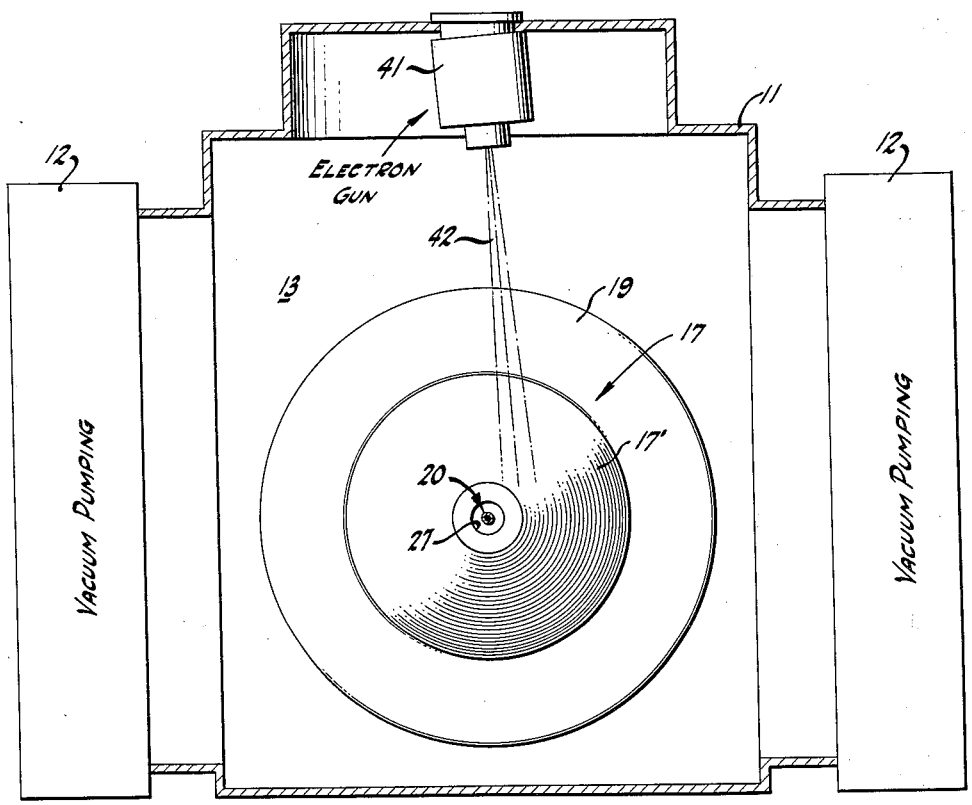
FIG. 2 is a transverse sectional view taken in the plane 2—2 of FIG. 1.

With regard to particular apparatus of the present invention adapted to carry out the method of the present invention, a preferred embodiment thereof is illustrated in FIGS. 1 and 2 of the drawings, wherein there will be seen to be provided an enclosure 11 having evacuation means 12 communicating therewith for maintaining a high vacuum in the chamber 13 defined within the enclosure. A pair of generally cylindrical magnet pole pieces 16 and 17 are disposed within the enclosure 11 in axial spaced alinement. An annular magnet winding 18 is wound about the pole piece 16, and a similar winding 19 is disposed about the pole piece 17. Suitable power supply means 21 are connected to these windings for energizing same to thereby establish a magnetic field within the pole pieces, and extending between same. The facing portions of the pole pieces 16 and 17 are tapered away from each other, so that the front face 16' of the pole piece 16 has a conical configuration with the small portion thereof closest to a conical front face 17' of the pole piece 17. This particular magnet pole piece configuration will be seen to establish a magnetic field 22, having lines of force curving outwardly from each of the pole pieces. These lines of force are illustrated by the dotted lines 22 in FIG. 1, and will be seen to present a convex field configuration.

In the instance wherein the material to be irradiated is an elongated object, such as, for example, an insulated wire 20 including a central electrical conductor 23 surrounded by a plastic insulating coating 24, such wire may be passed axially through the pole pieces. To this end, there are provided axially alined central passages 26 and 27 through the pole pieces 16 and 17, respectively, and the wire is extended therethrough. Passage of the wire through the enclosure 11 may be accomplished by extending the wire through the pole pieces and through the enclosure walls at vacuum-seals 29, and thence on to appropriate reels, or the like 31. Such a reel is illustrated at the right of FIG. 1, and same is therein indicated as being rotated by means such as an electric motor 32 connected thereto.

The electron beam of the apparatus may be generated in an electron gun 41 mounted, for example, at the top of the enclosure 11 within same, and directing a relatively high energy electron beam 42 downwardly therefrom alongside the axis of the pole pieces, and consequently, adjacent the wire undergoing irradiation. Suitable power supply means 43 may be electrically connected to the electron gun to energize same for generating the desired bombarding electron beam 42.

The apparatus of the present invention described above will be seen to be suitable for carrying out the method of the present invention. With regard to operation of the illustrated embodiment of the present invention, the magnet windings 18 and 19 are energized from the power supply 21 to thereby establish a magnetic field traversing the pole pieces 16 and 17, and having lines of force extending, as indicated at 22, between the adjacent faces 16' and 17' of these pole pieces. The electron gun 41 is energized from a suitable power supply 43 to thereby generate an electron beam, and furthermore, to direct same downwardly into the space between the magnet pole pieces 16 and 17. The electrically insulated wire 20 is then passed through the electron beam by rotating the take-up drum 31 about which the wire is wound, so as to draw the wire through the opening in the magnet pole pieces.

The electron beam 42 is directed in a plane perpendicularly bisecting the magnetic field between the pole pieces 16 and 17, and in that plane the beam is directed at a small angle to the wire being irradiated, so as to enter the magnetic field in offset relation to the wire. As the electron beam enters the magnetic field, the individual electrons thereof are subjected to a force at right angles to the direction of motion of same, and also at right angles to the direction of the lines of force of the magnetic field. This force then urges the electron beam toward the wire, and as the beam passes downwardly into an ever increasing magnetic field strength, the deflecting force increases in magnitude so that as a consequence, the electron beam spirals about the wire, as best seen in FIG. 3. It will be appreciated that the actual beam configuration about the wire is a function of the relative strength of the magnetic field, and the velocity of the electron beam, as well as the initial direction of trajectory of the latter. These relationships are well known so that same may be readily applied for any particular application of the present invention, to satisfy the requirement herein in that the beam shall spiral entirely about the wire. As illustrated in FIG. 3, the electron beam 42 spirals about the wire to thereby bombard the entire surface of the plastic insulation 24. Any variation in whole or in part of the electron beam from a path lying in the plane of irradiation extending normal to the magnetic field at the points of maximum convexity of the magnetic field lines, will cause such wandering electrons to be acted upon by a deflecting force urging same back into the plane. The convex field configuration into which the electron beam 42 is directed, will be seen to provide a focusing effect to maintain the beam directed in the desired plane of irradiation. Furthermore, the magnetic field herein employed serves the additional purpose of preventing escape of any portion of the electron beam, inasmuch as same is trapped within the field and focused onto the entire exterior surface of the wire passing through the plane or zone of irradiation. In the absence of the provisions herein made for insuring full bombardment of the entire surface of the material being passed through the irradiation zone, it will be appreciated that a substantial portion of the generated electron beam would be lost in passing by the material, and consequently bombarding some other portion of the apparatus, such as, for example, the lower wall of the enclosure 11. This is highly disadvantageous, inasmuch as a substantial quantity of input energy would thus be lost, and furthermore, damage would occur to the bombarded portions of the apparatus.

The invention hereof may be alternatively employed as an energy selector for irradiation processing. In the circumstance wherein the electron gun 41 produces a beam composed of electrons having a substantial energy range, the magnetic field strength and/or the angle of inclination of the beam may be varied to select the desired maximum irradiating energy, inasmuch as the orbiting of electrons about the wire or the like is a function of the electron velocity and direction, as well as field strength, it is thus possible to select the maximum electron velocity which will result in the electrons being trapped in the field. Electrons having higher velocities will thus be intentionally passed through the magnetic field without being trapped therein.

The foregoing is advantageous in comparison with conventional irradiation systems wherein the beam energy is not readily varied at the gun. In the irradiation of wire, for example, different beam energies may be desired for different wires, as the latter may have different properties or insulation thickness. Bombardment of a wire with electrons of too great an energy will cause the electrons to pass through the insulation and heat the conducting core, however, in accordance herewith electrons having energies in excess of a usable maximum may be intentionally lost by setting the strength of the magnetic field or the angle of inclination of the beam so that unwanted high-energy electrons will not be trapped in the field to spiral into the wire. An additional degree of readily available control may thus be provided by the present invention.

What is claimed is:

1. Apparatus for the irradiation of wire having insulation thereon for improving the insulating properties of the insulation upon the wire comprising a pair of axially alined pole pieces spaced apart, magnet coils linked with said pole pieces for establishing a magnetic field between said pole pieces with an increasing field intensity radially inward thereof, means passing said wire through the space between said pole pieces along the maximum intensity portion of the field, and an electron beam generator directing an electron beam radially inward of the magnetic field toward the maximum intensity portion thereof along a line slightly offset from the wire whereby the beam is deflected by the magnetic field to traverse a spiral about said wire and bombard the entire insulating surface of the wire.

2. Apparatus for irradiating materials comprising means establishing an axial magnetic field having a maximum intensity along an axis and decreasing radially outward thereof, an electron gun projecting electrons in a direction toward the axis of said magnetic field and slightly offset from said axis, whereby said beam is deflected to spiral inwardly about the field axis, and means passing said material axially through said magnetic field for bombardment by electrons on all sides thereof.

3. Apparatus as set forth in claim 2, further characterized by means including a pair of pole pieces spaced axially of said magnetic field and having oppositely disposed frusto-conical surfaces directing the magnetic field therebetween radially outward of each face as well as toward the other face to thereby define a curved magnetic field having an equipotential plane between the pole pieces normal to the axis of the magnetic field, and said electron gun directing electrons into said field in said plane.

4. Apparatus for irradiating materials comprising a pair of magnet pole pieces having facing frusto-conical surfaces, means establishing a magnetic field between said pole pieces whereby such field has a maximum intensity along the field axis and decreases radially outward thereof, means moving material to be irradiated along said field axis through said pole pieces, and means directing an electron beam radially into said magnetic field normal thereto and generally toward the axis thereof but slightly away from same, whereby said beam is spiralled about the field axis to bombard the entire surface of said material.

5. Apparatus for irradiating an elongated element comprising means feeding said element along an axis, a pair of apertured magnet pole pieces disposed with said axis passing through apertures of the pole pieces, said pole pieces being disposed in spaced-apart facing relation to each other and having a minimum separation adjacent said axis, means energizing said magnet pole pieces to establish a magnetic field therebetween having a maximum intensity about said axis, and means directing electrons transversely into said magnetic field between said pole pieces at least in part out of line with said axis, said electrons being magnetically deflected by said magnetic field to irradiate all sides of said elongated element as same is passed along said axis through said pole pieces.

References Cited in the file of this patent

UNITED STATES PATENTS

| | | |
|---|---|---|
| 2,741,704 | Trump et al. | Apr. 10, 1956 |
| 2,892,946 | Dewey et al. | June 30, 1959 |
| 2,897,365 | Dewey et al. | July 28, 1959 |